United States Patent [19]

Cuscurida et al.

[11] 3,759,971
[45] Sept. 18, 1973

[54] PURIFICATION OF ISOCYANATES

[75] Inventors: Michael Cuscurida, Austin; James Edward Kmiecik, Houston, both of Tex.

[73] Assignee: Jefferson Chemical Company, Inc., Houston, Tex.

[22] Filed: Jan. 20, 1971

[21] Appl. No.: 108,146

[52] U.S. Cl............................................. 260/453 SP
[51] Int. Cl............................................ C07c 119/04
[58] Field of Search............................... 260/453 SP

[56] References Cited
UNITED STATES PATENTS

| | | | |
|---|---|---|---|
| 2,835,692 | 5/1958 | Bloom et al. | 260/453 |
| 3,155,699 | 11/1964 | Powers | 260/453 |
| 3,458,558 | 7/1969 | Cheng | 260/453 |

Primary Examiner—Lewis Gotts
Assistant Examiner—Dolph H. Torrence
Attorney—John R. Kirk, H. G. Jackson and Terrence D. Dreyer

[57] ABSTRACT

Synthetic metal silicates greatly reduce the amount of hydrolyzable chlorides and acids present in isocyanates. Isocyanates are useful, for example, in forming polyurethane materials.

7 Claims, No Drawings

PURIFICATION OF ISOCYANATES

BACKGROUND OF THE INVENTION

1. Field of the Invention

This invention relates to the field of isocyanate purification.

2. Description of the Prior Art

Commercial isocyanates are often made by the phosgenation of amines. The crude products prepared by phosgenation contain chlorine-containing impurities which are acidic and are not efficiently removed by fractional distillation. Among these impurities are hydrolyzable chlorides and acids.

It is to be understood that the term "hydrolyzable chlorine" refers to labile chlorine atoms which are loosely bound in a compound and not to a chlorine atom that is tightly chemically bound such as chlorine is in chlorobenzene. This value may be determined by extracting the chlorine from the isocyanate by hot solution in an aqueous-methanol solvent, or liberating the chlorine on hydrolysis of the compound with water. The extract is then subjected to a potentiometric titration of the chloride ion concentration with a standard silver nitrate solution. From the amount of silver nitrate necessary, the percentage of the hydrolyzable chlorine can be determined by a simple calculation. The term "acidity" as understood here is determined essentially in the same manner as the "hydrolyzable chlorine" content except dilute caustic is used in the titration of the free HCl or acid. From the amount of caustic used, the percent acidity as HCl can be determined.

The hydrolyzable chlorine and acidity have been reduced in the past by fractional distillation, but such a process is inconvenient, costly and inoperable for use when the particular isocyanate has a boiling point similar to the hydrolyzable chlorine containing material. Also, a high boiling isocyanate is difficult to distill under fractionation without high yield losses due to prolonged overheating.

Also, the hydrolyzable chlorides and acids may be reduced by the addition of metallic salts of iron. This method has serious drawbacks, however, since a considerable portion of the treating agent dissolves in the isocyanate thereby contaminating it.

The use of synthetic metallic silicates, however, solves these problems since treatment with insoluble silicates introduces only very small amounts of metal into the isocyanate and the spent treating agent may be recovered by simple filtration.

It is even possible using the process of my invention to reduce the hydrolyzable chloride and acid content of commercially available isocyanates which have presumably already been treated in some way to reduce these contaminants.

SUMMARY OF THE INVENTION

The invention is a process for treating isocyanates to remove hydrolyzable chlorides and acids using synthetic metal silicates as the treating agent to be contacted with the isocyanate.

DESCRIPTION OF THE PREFERRED EMBODIMENTS

The process of our invention may be carried out by contacting polymeric isocyanates with synthetic metal silicates for a sufficient length of time to reduce the hydrolyzable chlorides and acid to a desired level.

Synthetic metal silicates are useful in the process of our invention. For example, those resulting from the fusion of metal carbonates with silica at high temperatures. In this process carbon dioxide is driven off and a complex mixture of metal silicates is obtained. Other methods of preparing synthetic metal silicates are old in the art and are explained in standard encyclopedias and textbooks dealing with the subject. For example, see Kirk-Othmer Encyclopedia of Chemical Technology, 2nd Edition, Interscience, New York, 1969, 18, p. 157–159 and Cotton, G. W. and Wilkinson, F. Albert, Advanced Inorganic Chemistry, Interscience, 1962, p. 357.

Various synthetic metal silicates made in this manner are useful in the process of our invention. For example, the silicates of magnesium, calcium, zinc, lithium, barium, and aluminum are useful.

The synthetic metal silicates should be brought into intimate contact with the isocyanate to be treated. Of course the more finely divided the synthetic silicate is the shorter the contact time required to reduce the contaminates to a desired level. The examples which follow illustrate typical contact times and corresponding reductions in contaminates.

The isocyanates to be treated may be completely untreated or they may be commercial products. In either case the process of our invention is useful for reducing the hydrolyzable chloride and acid content.

The following examples will illustrate the process of our invention but are not to be construed as limiting its scope.

EXAMPLE 1

This example illustrates the reduction in hydrolyzable chloride and acid content of a previously untreated isocyanate after treatment with synthetic magnesium silicate.

A one-liter flask equipped with thermometer, paddle-type stirrer, reflux condenser and nitrogen inlet was charged with 500 g. of 2.2 functional polymethylene polyphenylisocyanate and 25 g. of dry, synthetic magnesium silicate. The mixture was stirred under nitrogen at 90°–110° for 2 hrs., 25 min., cooled slightly and the magnesium silicate removed by filtration Analyses of the isocyanate before and after treatment were as follows:

|  | Before Treatment | After Treatment |
|---|---|---|
| Sodium (ppm.) | Unknown | 0.7 |
| Magnesium (ppm.) | Unknown | 0.8 |
| Total Chloride (wt. %) | 0.59 | 0.39 |
| Hydrolyzable chloride (wt. %) | 0.20 | 0.03 |
| Total acidity (wt. % as HCl | 0.17 | 0.02 |

Thus, most of the hydrolyzable chloride and acidity were removed from the isocyanate and very little magnesium was introduced.

EXAMPLE 2

Using the same equipment, the same amounts of isocyanate and synthetic magnesium silicate and operating in the same manner as described in Example 1 except at 45°–59° for 2 hours, the following results were obtained:

|  | Before Treatment | After Treatment |
|---|---|---|
| Sodium (ppm.) | Unknown | 0.1 |
| Magnesium (ppm.) | Unknown | 0.5 |
| Total chloride (wt. %) | 0.59 | 0.41 |

| | | |
|---|---|---|
| Hydrolyzable chloride (wt. %) | 0.20 | 0.06 |
| Total acidity (wt. % as HCl) | 0.17 | 0.03 |

From these results it is apparent that treatment at about 50° removes chlorides and acidity from isocyanates, although not as effectively as treatment at 100° (Example 1).

EXAMPLE 3

This example shows that isocyanates can be treated with synthetic magnesium silicate at elevated temperatures with no significant increase in viscosity or change in isocyanate content.

A 500 ml. flask equipped as described in Example 1 was charged with 250 g. of 2.2 functional polymethylene polyphenyl isocyanate and 10 g. of dry synthetic magnesium silicate. The mixture was stirred under nitrogen at 125° for 2 hours, cooled slightly and filtered to remove the treatment agent. Analyses of the isocyanate before and after treatment were as follows:

| | Before Treatment | After Treatment |
|---|---|---|
| Total chloride (wt. %) | 0.59 | 0.41 |
| Hydrolyzable chloride (wt. %) | 0.16 | 0.05 |
| Total acidity (wt. % as HCl) | 0.12 | 0.03 |
| Viscosity (cps.) | 75 | 100 |
| Isocyanate equivalent weight | 133 | 134 |

EXAMPLE 4

A two-liter flask equipped as described in Example 1 was charged with 1,000 g. of 2.7 functional polymethylene polyphenyl isocyanate and 40 g. of dry synthetic magnesium silicate. The mixture was stirred under nitrogen at 125° for 2 hours and the magnesium silicate was removed by filtration. Analyses of the isocyanate before and after treatment were as follows:

| | Before Treatment | After Treatment |
|---|---|---|
| Total chloride (wt. %) | 0.59 | 0.41 |
| Hydrolyzable chloride (wt. %) | 0.20 | 0.05 |
| Total acidity (wt. % as HCl) | 0.17 | 0.03 |

Thus, magnesium silicate treatment of a 2.7 functional polymethylene polyphenyl isocyanate effectively removes hydrolyzable chloride and acidity.

EXAMPLE 5

This example illustrates results obtained using two different synthetic magnesium silicate: isocyanate weight ratios in the method of isocyanate treatment described in Example 1. Both treatments were conducted by stirring the polymethylene polyphenyl isocyanate — synthetic magnesium silicate mixture under nitrogen at 125° for 2 hours and recovering the isocyanate by filtration. Before treatment, values for total chloride, hydrolyzable chloride and total acidity were 0.61 wt. percent, 0.18 wt. percent and 0.12 wt. percent (as (HCl) respectively.

| | Treated Isocyanate | | |
|---|---|---|---|
| Silicate:isocyanate weight ratio | Total chloride (wt. %) | Hydrolyzable chloride (wt. %) | Total acidity (wt. % as HCl) |
| 40:1000 | 0.32 | 0.04 | 0.01 |
| 20:1000 | 0.38 | 0.08 | 0.06 |

EXAMPLE 6

This example illustrates the increase in iron content observed in a nondistillable isocyanate when ferric chloride of the prior art is used as a treating agent in an attempt to lower hydrolyzable chloride and acidity levels.

A 500 ml. flask equipped as described in Example 1 was charged with 250 g. of polymethylene polyphenyl isocyanate and 0.25 g. of anhydrous ferric chloride. The mixture was stirred under nitrogen at 125° for 2 hours and filtered. The recovered ferric chloride was not weighed but appeared to be approximately the amount added at the beginning of the experiment.

Analyses of the isocyanate before and after treatment were:

| | Before Treatment | After Treatment |
|---|---|---|
| Total chloride (wt. %) | 0.59 | 0.51 |
| Hydrolyzable chloride (wt. %) | 0.20 | 0.16 |
| Total acidity (wt. % as HCl) | 0.17 | 0.13 |
| Iron content (ppm.) | 24.6 | 257 |

Thus, while a slight reduction in chloride and acid content occurs, the iron content rises to an undesirable value. The iron could be removed by distillation of a lower boiling isocyanate such as toluene diisocyanate. Since polymethylene polyphenyl isocyanate cannot be distilled, ferric chloride cannot be used as a treating agent.

EXAMPLE 7

This example illustrates the use of synthetic silicates other than magnesium silicate in the removal of hydrolyzable chlorides and acidity from isocyanates. In all instances the silicate was stirred with the polymethylene polyphenyl isocyanate under nitrogen.

EXAMPLE 7

| | | | | | Total chloride (wt. percent) | | Hydrolyzable chloride (wt. percent) | | Total acidity (wt. percent at HCl) | |
|---|---|---|---|---|---|---|---|---|---|---|
| Silicate used | Amount of isocyanate (g.) | Amount of silicate (g.) | Treatment time (hrs.) | Temperature (° C.) | Before treatment | After treatment | Before treatment | After treatment | Before treatment | After treatment |
| Aluminum | 250 | 10 | 2 | 125 | 0.59 | 0.55 | 0.20 | 0.14 | 0.17 | 0.09 |
| Barium | 250 | 10 | 2 | 125 | 0.59 | 0.58 | 0.20 | 0.04 | 0.17 | 0.02 |
| Lithium | 250 | 10 | 2 | 125 | 0.59 | 0.46 | 0.20 | 0.10 | 0.17 | 0.08 |
| Zinc | 250 | 25 | 2.5 | 90–110 | 0.61 | 0.48 | 0.16 | 0.028 | 0.16 | Nil |
| Magnesium | 250 | 10 | 2 | 125 | 0.59 | 0.41 | 0.20 | 0.05 | 0.17 | 0.03 |
| Calcium | 250 | 10 | 2 | 125 | 0.61 | 0.32 | 0.18 | 0.03 | 0.12 | 0.01 |

EXAMPLE 8

This example illustrates the improvement in rigid foam cell structure obtained by treating a polymethylene polyphenyl isocyanate with synthetic magnesium silicate. Treatment of the isocyanate using the general process described in previous examples reduced hydrolyzable chloride and acidity from 0.10 wt. percent and 0.08 wt. percent (as HCl) to 0.02 wt. percent and 0.008 wt. percent (as HCl).

Using a typical rigid urethane polyol rigid foams were prepared using treated and untreated isocyanate. The cell structure of the foam from untreated isocyanate was very coarse and open, containing only 0.03 percent closed cells. In contrast, foam prepared using the same formulation with treated isocyanate, appeared normal and had 88 percent closed cells.

EXAMPLE 9

This example illustrates general improvements in foam qualities that can be obtained by treating the isocyanate component with synthetic magnesium silicate. Two 2.2 functional polymethylene polyphenyl isocyanates (designated A and B) were treated following the general procedure given in previous examples. Using a standard formulation, rigid foams were then prepared from treated and untreated isocyanates and the same polyol used in Example 8. Analyses of the isocyanates before and after treatment as well as qualities of foams prepared from them are given in the following table.

|  | A | | B | |
|---|---|---|---|---|
| Isocyanate | Untreated | Treated | Untreated | Treated |
| Total chloride (wt. percent) | 0.87 | 0.49 | 0.82 | 0.50 |
| Hydrolyzable chloride (wt. percent) | 0.28 | 0.06 | 0.31 | 0.08 |
| Total acidity (wt. percent as HCl) | 0.21 | 0.04 | 0.22 | 0.05 |
| Foam properties: | | | | |
| Cream time (sec.) | 45 | 45 | 45 | 45 |
| Rise time (sec.) | 240 | 240 | 230 | 210 |
| Tack-free time (sec.) | 210 | 160 | 180 | 165 |
| Density (lb./ft.$^3$) | 1.7 | 1.8 | 1.7 | 1.8 |
| K-factor | 0.172 | 0.130 | 0.153 | 0.126 |
| Compress. strength, W.R. | 28.7 | 33.6 | 28.3 | 33.9 |
| Percent closed cells | 76.4 | 90.0 | 81.7 | 90.0 |
| Burn rate (in./sec.) | 1.76/32.8 | 1.52/33.2 | 1.60/32 | 1.38/31.4 |

The beneficial effects of synthetic magnesium silicate treatment of isocyanates are observed from a study of the two sets of data tabulated above.

EXAMPLE 10

This example illustrates the improvement in hydrolyzable chloride and acid content of commercial isocyanates using synthetic magnesium silicate. Significant improvements were noted in all cases. A foam was made in each case using identical formulations to show that reaction rates were increased without degradation of physical properties of the foam.

EXAMPLE 10

|  | A | | B | | C | | D | | E | |
|---|---|---|---|---|---|---|---|---|---|---|
| Isocyanate | Untreated | Treated | Untreated | Treated | Untreated | Treated | Untreated | Treated | Untreated | Treated |
| Isocyanate equivalent | 132.5 | 140.0 | 132.1 | 135.7 | 134.4 | 141.2 | 133.3 | 135.0 | 135.4 | 136.1 |
| Total chloride, wt. percent | 0.53 | 0.41 | 0.25 | 0.19 | 0.73 | 0.61 | 0.44 | 0.35 | 0.41 | 0.30 |
| Hydrolyzable chloride, wt. percent | 0.13 | 0.12 | 0.13 | 0.04 | 0.33 | 0.16 | 0.18 | 0.12 | 0.12 | 0.12 |
| Acidity, wt. percent as HCl | 0.10 | 0.01 | 0.02 | 0.004 | 0.18 | 0.04 | 0.07 | 0.02 | 0.10 | 0.02 |
| Wt. percent MDI | 51.0 | 49.2 | 49.6 | 48.8 | 49.1 | 51.4 | 45.7 | 50.1 | 68.2 | 72.0 |
| Isomer distribution in MDI: | | | | | | | | | | |
| Wt. percent 2,2' | 3.9 | 4.3 | <0.1 | <0.1 | | | 0.1 | | | |
| Wt. percent 2,4' | 31.6 | 30.8 | 4.3 | 4.4 | 1.2 | 0.6 | 2.7 | 3.9 | 1.0 | 1.4 |
| Wt. percent 4,4' | 64.5 | 64.9 | 95.7 | 95.6 | 98.8 | 99.4 | 97.3 | 96.0 | 99.0 | 98.6 |
| Reaction rate (foam): | | | | | | | | | | |
| Cream time, sec | 50 | 50 | 50 | 47 | 50 | 45 | 43 | 45 | 45 | 43 |
| Rise time, sec | 250 | 225 | 240 | 235 | 230 | 195 | 215 | 195 | 240 | 210 |
| Tack free time, sec | 190 | 165 | 160 | 160 | 175 | 135 | 145 | 135 | 160 | 145 |
| Physical properties (foam): | | | | | | | | | | |
| Density, pcf | 1.94 | 1.92 | 1.97 | 1.94 | 1.90 | 1.96 | 1.94 | 1.94 | 1.80 | 1.89 |
| K-factor | 0.123 | 0.121 | 0.123 | 0.123 | 0.126 | 0.122 | 0.126 | 0.133 | 0.134 | 0.128 |
| Compr. strength, W.R. | 39 | 40 | 36 | 40 | 38 | 40 | 37 | 37 | 33 | 35 |
| Heat dist. temp., °C | 164 | 167 | 171 | 172 | 171 | 180 | 169 | 178 | 166 | 162 |
| Percent closed cells | 91 | 92 | 90 | 91 | 91 | 92 | 92 | 92 | 90 | 92 |
| Burn, in./sec | 1.1/32 | 1.4/35 | 1.4/32 | 1.3/31 | 1.0/35 | 1.1/35 | 1.5/33 | 1.5/33 | 1.6/35 | 1.4 |
| | Volume change, percent | | | | | | | | | |
| Dimensional stability: | | | | | | | | | | |
| 1 wk., −20° F., dry | −3.0 | −2.5 | −3.0 | −3.2 | −3.7 | −3.5 | −3.4 | −3.2 | −3.2 | −2.7 |
| 1 wk., 180° F., dry | 2.2 | 2.2 | 2.6 | 2.4 | 2.4 | 2.4 | 2.7 | 2.4 | 2.2 | 2.6 |
| 1 wk., 158° F., 100% R.H. | 6.1 | 7.8 | 5.3 | 5.5 | 7.1 | 4.8 | 5.1 | 4.4 | 6.2 | 5.1 |

It is to be understood that the synthesis of the organic isocyanate does not form a part of this invention. The product from any method of preparing organic isocyanates which results in the final product having a hydrolyzable chlorine or acidity content may be treated by the process of this invention to remove the hydrolyzable chlorine containing substituents. As an example of a suitable method of preparing organic isocyanates, the corresponding amine or amine salts are reacted with phosgene in the manner known in the art. The following patents set forth procedures which may be used in the preparation of the organic isocyanates: U.S. Pat. Nos. 2,480,089, 2,680,127, 2,680,128, 2,733,254, 2,837,554, 2,839,559 and 2,875,225. The phosgenation procedure is generally utilized in the preparation of isocyanates because of the economy of the method and the resulting superior yields obtained.

We claim

1. In a process to remove hydrolyzable chloride and acid contaminates from isocyanates the improvement which comprises contacting the isocyanate with synthetic metal silicates wherein the synthetic metal silicate is the silicate of magnesium, calcium, zinc, lithium, barium or aluminum.

2. The process of claim 1 wherein the synthetic metal silicate is the silicate of magnesium.

3. The process of claim 1 wherein the synthetic metal silicate is the silicate of calcium.

4. The process of claim 1 wherein the synthetic metal silicate is the silicate of zinc.

5. The process of claim 1 wherein the synthetic metal silicate is the silicate of lithium.

6. The process of claim 1 wherein the synthetic metal silicate is the silicate of barium.

7. The process of claim 1 wherein the synthetic metal silicate is the silicate of aluminum.

* * * * *